United States Patent
Hosseini et al.

(10) Patent No.: US 11,792,856 B2
(45) Date of Patent: Oct. 17, 2023

(54) UPLINK COLLISION HANDLING

(71) Applicant: QUALCOMM Incorporated, San Diego, CA (US)

(72) Inventors: Seyedkianoush Hosseini, San Diego, CA (US); Peter Gaal, San Diego, CA (US); Yi Huang, San Diego, CA (US); Wanshi Chen, San Diego, CA (US); Wei Yang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 106 days.

(21) Appl. No.: 17/174,017

(22) Filed: Feb. 11, 2021

(65) Prior Publication Data

US 2021/0259018 A1 Aug. 19, 2021

Related U.S. Application Data

(60) Provisional application No. 62/976,235, filed on Feb. 13, 2020.

(51) Int. Cl.
*H04W 74/08* (2009.01)
*H04W 72/0453* (2023.01)
*H04W 72/1268* (2023.01)
*H04W 72/566* (2023.01)

(52) U.S. Cl.
CPC ... *H04W 74/0825* (2013.01); *H04W 72/0453* (2013.01); *H04W 72/1268* (2013.01); *H04W 72/569* (2023.01)

(58) Field of Classification Search
None
See application file for complete search history.

(56) References Cited

U.S. PATENT DOCUMENTS

| 2019/0044678 | A1 | 2/2019 | Liu et al. | |
| 2021/0051649 | A1* | 2/2021 | He | H04W 72/0413 |
| 2021/0144708 | A1* | 5/2021 | Wang | H04W 72/1289 |
| 2021/0218503 | A1* | 7/2021 | Babaei | H04L 1/1812 |
| 2021/0258974 | A1* | 8/2021 | Hosseini | H04W 72/1242 |

(Continued)

FOREIGN PATENT DOCUMENTS

WO WO-2022086888 A1 * 4/2022

OTHER PUBLICATIONS

ETSI—ETSI TS 138 214 V15.8.0 (Jan. 2020) (Year: 2020).*

(Continued)

*Primary Examiner* — The Hy Nguyen
(74) *Attorney, Agent, or Firm* — Harrity & Harrity, LLP (57) ABSTRACT

The present disclosure generally relates to wireless communication. In some aspects, a user equipment (UE) may identify a collision between a first uplink transmission and a second uplink transmission, wherein the first uplink transmission is a high priority uplink transmission and the second uplink transmission is a low priority uplink transmission; and cancel the second uplink transmission based at least in part on a threshold delay period, wherein the threshold delay period is based at least in part on a UE processing capability and a minimum processing timeline capability, and wherein the second uplink transmission is canceled before a first overlapping symbol of the first uplink transmission and the second uplink transmission. Numerous other aspects are provided.

26 Claims, 5 Drawing Sheets

(56) References Cited

U.S. PATENT DOCUMENTS

| | | | |
|---|---|---|---|
| 2022/0030601 A1* | 1/2022 | Wang | H04W 72/23 |
| 2022/0104222 A1* | 3/2022 | Ahn | H04W 52/365 |
| 2023/0039964 A1* | 2/2023 | Wang | H04W 72/0453 |
| 2023/0189260 A1* | 6/2023 | Bae | H04L 5/00 370/329 |

OTHER PUBLICATIONS

Wang—U.S. Appl. No. 62/932,881—Method and apparatus for Uplink Cancellation Indication, filed Nov. 8, 2019 (Year: 2019).*

U.S. Appl. No. 62/932,881; Wang, Hai-Han; Method and apparatus for Uplink Cancellation Indication, filed Nov. 8, 2019 (Year: 2019).*

ETSI TS 138 213 V15.2.0 (Jul. 2018)—5G; NR; Physical layer procedures for control (Year: 2018).*

International Search Report and Written Opinion—PCT/US2021/017928—ISA/EPO—dated May 28, 2021.

Motorola Mobility, et al., "UCI Enhancement for URLLC", 3GPP TSG RAN WG1 Meeting #99, 3GPP Draft, R1-1912851, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), pp. 1-3, XP051823649, Retrieved from the Internet: URL: https://ftp.3gpp.org/tsg_ran/WG1_RL1/TSGR1_99/Docs/R1-1912851.zip [retrieved on Nov. 9, 2019] sections 1-4.

QUALCOMM Incorporated: "Summary #1 of Enhancements to Scheduling/HARQ", 3GPP TSG-RAN WG1 Meeting #98b, 3GPP Draft, R1-1911503 Summary #1 of Enhancements to Scheduling_HARQ 98B, 3rd Generation Partnership Project (3GPP), Mobile Competence Centre, 650, Route Des Lucioles, F-06921 Sophia-Antipolis Cede, vol. RAN WG1, No. Chongqing, China, Oct. 14, 2019-Oct. 20, 2019, Oct. 22, 2019 (Oct. 22, 2019), 45 Pages, XP051798768, Retrieved from the Internet: URL: https://ftp.3gpp.org/tsg_ran/WG1_RL1/TSGR1_98b/Docs/R1-1911503.zip [retrieved on Oct. 22, 2019] sections 1-6.

* cited by examiner

UPLINK COLLISION HANDLING

CROSS-REFERENCE TO RELATED APPLICATION

This Patent Application claims priority to U.S. Provisional Patent Application No. 62/976,235, filed on Feb. 13, 2020, entitled "UPLINK COLLISION HANDLING," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for uplink collision handling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include identifying a collision between a first uplink transmission and a second uplink transmission, wherein the first uplink transmission is a high priority uplink transmission and the second uplink transmission is a low priority uplink transmission; and cancelling the second uplink transmission based at least in part on a threshold delay period, wherein the threshold delay period is based at least in part on a UE processing capability and a minimum processing timeline capability, and wherein the second uplink transmission is canceled before a first overlapping symbol of the first uplink transmission and the second uplink transmission.

In some aspects, a UE for wireless communication may include a memory and one or more processors operatively coupled to the memory. The memory and the one or more processors may be configured to identify a collision between a first uplink transmission and a second uplink transmission, wherein the first uplink transmission is a high priority uplink transmission and the second uplink transmission is a low priority uplink transmission; and cancel the second uplink transmission based at least in part on a threshold delay period, wherein the threshold delay period is based at least in part on a UE processing capability and a minimum processing timeline capability, and wherein the second uplink transmission is canceled before a first overlapping symbol of the first uplink transmission and the second uplink transmission.

In some aspects, a non-transitory computer-readable medium may store one or more instructions for wireless communication. The one or more instructions, when executed by one or more processors of a UE, may cause the one or more processors to identify a collision between a first uplink transmission and a second uplink transmission, wherein the first uplink transmission is a high priority uplink transmission and the second uplink transmission is a low priority uplink transmission; and cancel the second uplink transmission based at least in part on a threshold delay period, wherein the threshold delay period is based at least in part on a UE processing capability and a minimum processing timeline capability, and wherein the second uplink transmission is canceled before a first overlapping symbol of the first uplink transmission and the second uplink transmission.

In some aspects, an apparatus for wireless communication may include means for identifying a collision between a first uplink transmission and a second uplink transmission, wherein the first uplink transmission is a high priority uplink transmission and the second uplink transmission is a low priority uplink transmission; and means for cancelling the second uplink transmission based at least in part on a threshold delay period, wherein the threshold delay period is based at least in part on an apparatus processing capability and a minimum processing timeline capability, and wherein the second uplink transmission is canceled before a first overlapping symbol of the first uplink transmission and the second uplink transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
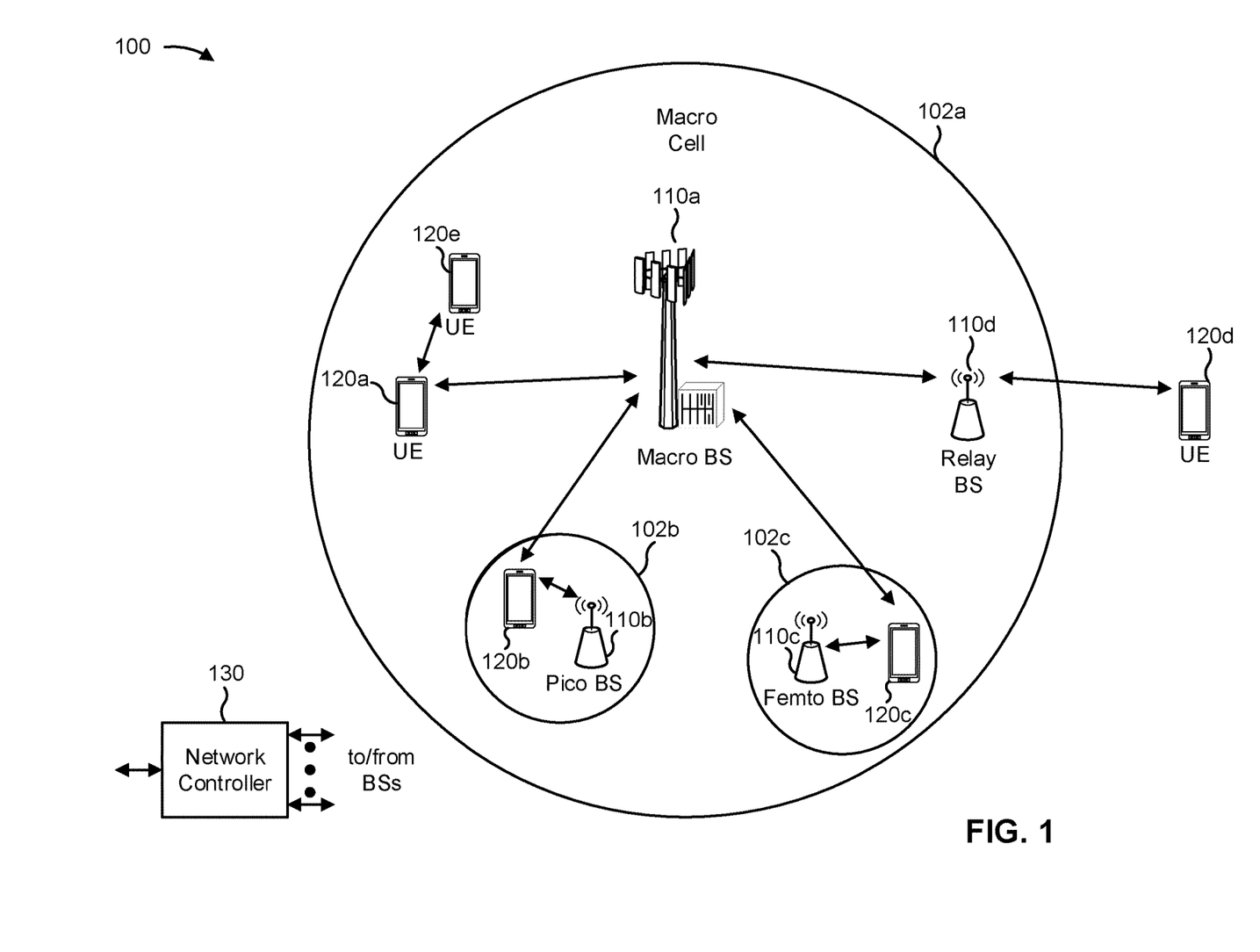
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
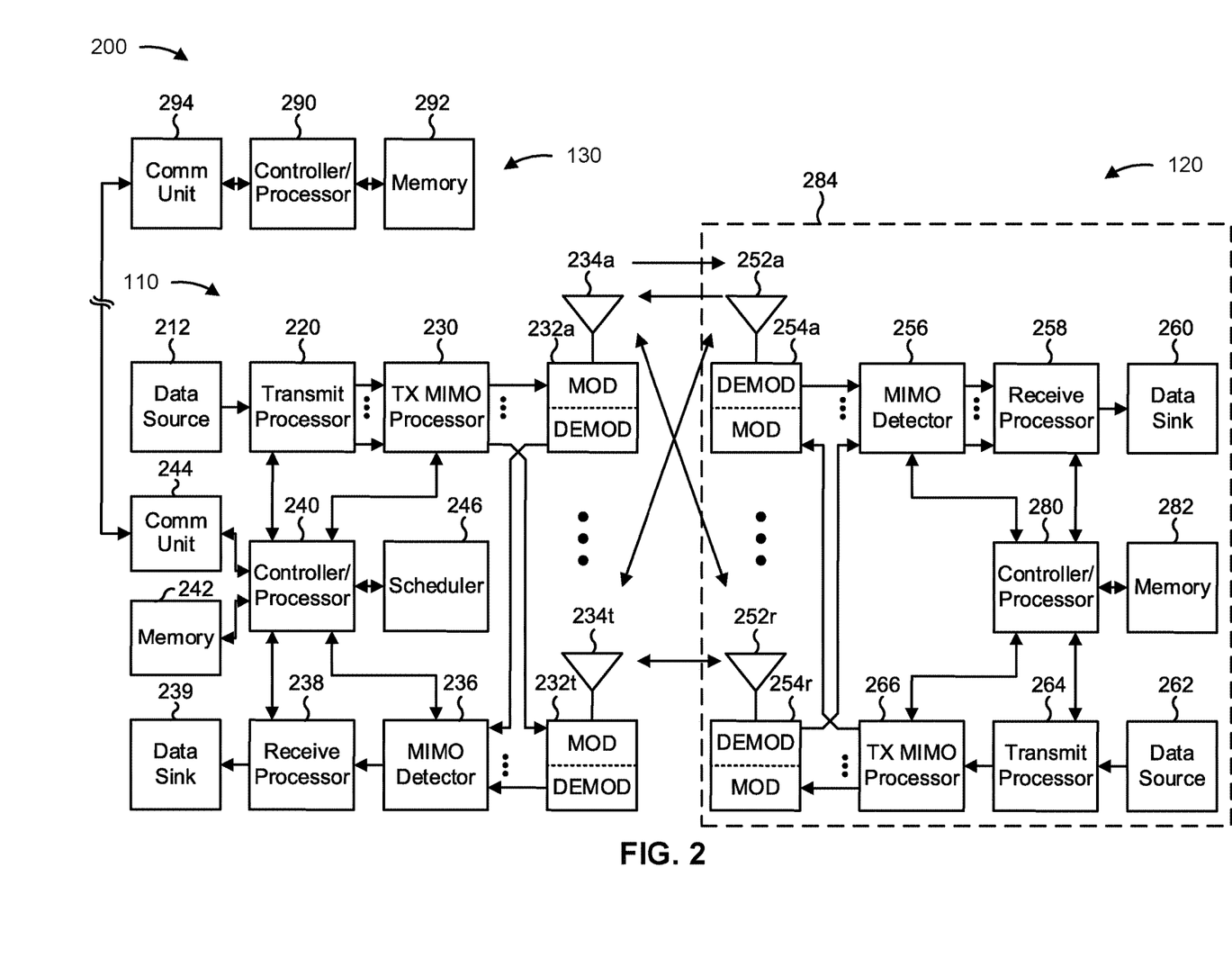
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-4.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-4.

Controller/processor 240 of base station 110, controller/processor 280 of UE 120, and/or any other component(s) of FIG. 2 may perform one or more techniques associated with uplink collision handling, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4 and/or other processes as described herein. In some aspects, executing instructions may include running the instructions, converting the instructions, compiling the instructions, and/or interpreting the instructions, among other examples.

In some aspects, the user equipment (UE) includes means for identifying a collision between a first uplink transmission and a second uplink transmission, wherein the first uplink transmission is a high priority uplink transmission and the second uplink transmission is a low priority uplink transmission; or means for cancelling the second uplink transmission based at least in part on a threshold delay period, wherein the threshold delay period is based at least in part on a UE processing capability and a minimum processing timeline capability, and wherein the second uplink transmission is canceled before a first overlapping symbol of the first uplink transmission and the second uplink transmission. The means for the user equipment (UE) to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, different uplink channels may be associated with different priority levels. For example, a UE may receive a priority indication identifying a high priority uplink channel, such as a high priority physical uplink control channel (PUCCH), and a low priority uplink channel, such as a low priority physical uplink shared channel (PUSCH). ABS may use downlink control information (DCI) to convey a priority indication for a dynamic grant PUSCH, a PUCCH associated with a hybrid automatic repeat request (HARD) acknowledgement message (ACK), and/or the like. Similarly, the BS may use radio resource control (RRC) configuration information to convey a priority indication. Some uplink channels may be associated with a default priority and the UE may use the default priority unless an explicit indicator is received to override the default priority. For example, a periodic or semi-persistent channel state information (CSI) may be associated with a low priority as a default condition. Similarly, a periodic or semi-persistent sounding reference signal (SRS) may be associated with a low priority as a default condition.

When a plurality of uplink channels of different priorities collide in a time domain, the UE may be unable to multiplex the plurality of uplink channels together for transmission. Similarly, the UE may be unable to concurrently transmit the plurality of uplink channels. As a result, the UE may drop a low priority channel to enable a transmission of a high priority channel. For example, the UE may drop a low priority PUSCH to enable transmission of a high priority PUCCH on the same or a different carrier. Similarly, the UE may drop a low priority PUCCH to enable transmission of a high priority PUCCH on the same carrier.

When the UE identifies a collision between a high priority channel and a low priority channel (e.g., based on a received dynamic grant for the high priority channel), the UE may drop the low priority channel and associated low priority uplink transmission based at least in part on a time defined by a specification. For example, the UE may cancel the low priority channel based at least in part on a time represented by an equation:

$$T_{drop} = T_{proc,2} + d_1 \quad (1)$$

where $T_{drop}$ represents a gap between an end of a physical downlink control channel (PDCCH) or a control resource set (CORESET) scheduling the high priority channel and a first symbol of the high priority channel (and hence, an earliest time that a collision can occur) (or a maximum time after the PDCCH at which the low priority channel is to be dropped), $T_{proc,2}$ represents a UE processing capability for a carrier on which the low priority channel is to be conveyed, and $d_1$ is a configurable value (e.g., 0 symbols, 1 symbol, 2 symbols, and/or the like) that the UE may report in a UE capability message. In this way, the UE and the BS remain synchronized with regard to when the low priority channel is to be dropped.

In some cases, the UE may have a plurality of subcarriers or serving cells configured, each with a different subcarrier spacing and each with a different minimum processing timeline capability. The minimum processing timeline capability may relate to a type of channel. For example, a particular component carrier may have a first minimum processing timeline capability, $n_1$, for a physical downlink shared channel (PDSCH) and a second minimum processing timeline capability, $n_2$, for a PUSCH. The UE processing capability, $T_{proc,2}$, is for a PUSCH and is based at least in part on $n_2$. However, in a multi-carrier deployment, the UE may be configured with different $n_2$ values from which to calculate the UE processing capability.

Some aspects described herein enable early uplink collision handling. For example, the UE may determine a time delay for cancelling an uplink transmission based at least in part on a UE processing capability and a minimum processing timeline capability. In this case, after the time delay, the UE may cancel, for example, a low priority uplink transmission to prioritize, for example, a high priority uplink transmission. In this way, the BS remains synchronized with the UE based at least in part on enabling the UE to compute the time delay deterministically based at least in part on the UE processing capability and the minimum processing timeline capability. Moreover, based at least in part on enabling cancellation of a low priority uplink transmission, the UE enables reduced network traffic, reduced likelihood of interference, and/or the like.

Figure 3:
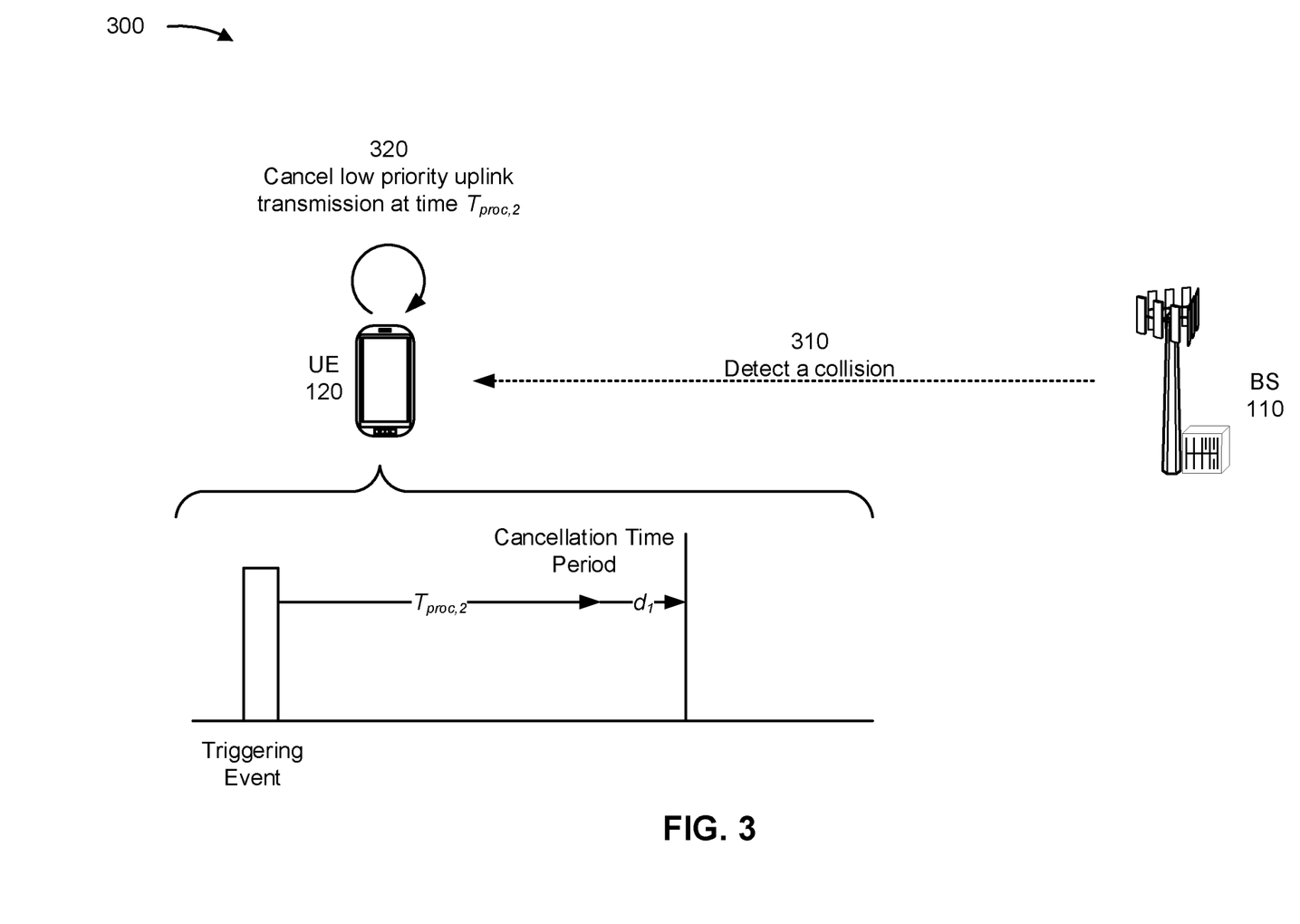
FIG. 3 is a diagram illustrating an example of uplink collision handling, in accordance with the present disclosure.

FIG. 3 is a diagram illustrating an example 300 of uplink collision handling, in accordance with the present disclosure. As shown in FIG. 3, example 300 includes a BS 110 and a UE 120.

As further shown in FIG. 3, and by reference number 310, UE 120 may detect a collision between a first uplink transmission and a second uplink transmission. For example, UE 120 may receive signaling from BS 110 scheduling a high priority uplink transmission that collides with a low priority uplink transmission. In this case, the high priority uplink transmission and the low priority uplink transmission may overlap with respect to scheduled resources (e.g., in a time domain, a frequency domain, and/or the like). In some aspects, UE 120 may receive signaling identifying a priority for an uplink transmission. For example, UE 120 may receive a downlink control information (DCI) indicating a priority for a dynamic grant physical uplink shared channel (PUSCH), a physical uplink control channel (PUCCH) conveying a hybrid automatic repeat request (HARD) acknowledgement (ACK) (HARQ-ACK) message, and/or the like. Additionally, or alternatively, UE 120 may receive radio resource control (RRC) signaling identifying a priority for a configured grant PUSCH, a scheduling request, and/or the like. In some aspects, UE 120 may determine a priority based at least in part on a stored default configuration. For example, UE 120 may determine that a periodic or semi-persistent channel state information (CSI) reference signal (RS) or a periodic or semi-persistent sounding reference signal (SRS) is of a low priority.

As further shown in FIG. 3, and by reference number 320, UE 120 may cancel a low priority uplink transmission based at least in part on a threshold delay period. The threshold delay period may identify a length of time between a triggering event for the high priority uplink transmission (e.g., a physical downlink control channel or control resource set scheduling the high priority uplink transmission) and a first symbol of the high priority uplink transmission (which may collide with the low priority uplink transmission). For example, UE 120 may cancel the low priority uplink transmission before the first colliding symbol of the high priority uplink transmission, and the first colliding symbol may occur at or after the threshold delay period. In this way, UE 120 prioritizes the high priority uplink transmission that collides with the low priority uplink transmission. In some aspects, UE 120 may determine the threshold delay period to determine when to cancel the low priority uplink transmission to remain synchronized with BS 110. For example, UE 120 determine the threshold delay period as $T_{drop}=T_{proc,2}+d_1$, as described above. In this case, the UE processing capability, $T_{proc,2}$, may be based at least in part on a minimum processing timeline capability, $n_2$, as described above.

In some aspects, UE 120 may determine the UE processing capability, $T_{proc,2}$, to determine the threshold delay period. For example, UE 120 may determine the UE processing capability based at least in part on an uplink subcarrier spacing of a carrier on which the low priority uplink transmission is to be conveyed. In this case, UE 120 may determine the minimum processing timeline capability based at least in part on an uplink timing capability configured for a channel on which the low priority uplink transmission is to be conveyed. In other words, when the low priority uplink transmission is a PUSCH communication on a particular subcarrier, UE 120 may determine the UE processing capability based at least in part on an uplink subcarrier spacing of the particular carrier and may determine the minimum processing timeline capability based at least in part on an uplink timing capability for PUSCH communications on the particular carrier. As a result, for example, when UE 120 is to drop a plurality of low priority PUSCH communications on a plurality of carriers, UE 120 may different low priority PUSCH communications at different symbols based at least in part on respective subcarrier spacings and uplink timing capabilities.

Additionally, or alternatively, UE 120 may determine the UE processing capability based at least in part on a minimum subcarrier spacing. For example, UE 120 may determine a subcarrier spacing from which to compute the UE processing capability based at least in part on a minimum subcarrier spacing among a downlink carrier on which the high priority downlink transmission (e.g., a PDCCH) triggers the high priority uplink transmission (e.g., a PUCCH) and an uplink carrier on which the low priority uplink communication is to be conveyed. In this case, UE 120 may determine the minimum processing timeline capability based at least in part on an uplink timing capability of the channel of the uplink carrier on which the low priority uplink communication is to be conveyed. Additionally, or alternatively, UE 120 may determine the minimum processing timeline capability based at least in part on a PDSCH processing timeline capability for a PDSCH associated with the high priority uplink transmission (e.g., a high priority PUCCH).

Additionally, or alternatively, UE 120 may determine a set of UE processing capabilities for a set of carriers on which a set of low priority uplink transmissions are to be conveyed (e.g., based at least in part on uplink subcarrier spacings of the set of carriers). In this case, UE 120 may determine the UE processing capability based at least in part on a maximum value in the set of UE processing capabilities. In some aspects, to determine the set of UE processing capabilities, UE 120 may use a minimum subcarrier spacing among a set of subcarrier spacings for a high priority downlink transmission triggering the high priority uplink transmission and for a low priority channel of an uplink carrier on which the low priority uplink transmission is to be conveyed. In some aspects, UE 120 may determine a UE processing capability of a high priority channel and a UE processing capability of a low priority channel, as described herein (e.g., a maximum value of a set of low priority channel UE processing capabilities), and may select, for example, a maximum value between the UE processing capability of the high priority channel and the UE processing capability of the low priority channel. Additionally, or alternatively, UE 120 may determine a minimum subcarrier spacing among high priority channels and determine a UE processing capability based at least in part on the minimum processing capability.

Additionally, or alternatively, UE 120 may determine a subcarrier spacing for the UE processing capability based at least in part on a minimum subcarrier spacing of a set of subcarrier spacings. In this case, the set of subcarrier spacings may include subcarrier spacings of low priority channels associated with carriers on which the low priority uplink transmission is to be conveyed, a subcarrier spacing of a high priority PDCCH that triggers the high priority uplink transmission, a PUCCH subcarrier spacing, a subcarrier spacing of the high priority uplink transmission, a subcarrier spacing of a low priority PDCCH that triggers the low priority uplink transmission, and/or the like. Further, UE 120 may determine the minimum processing timeline capability based at least in part on a configuration of one or more carriers. For example, when a channel, of a set of channels (e.g., all configured channels, low priority channels, the PDSCH associated with a PUCCH, and/or the like), is configured with a particular capability for $n_2$ relating to the determined subcarrier spacing described above, UE 120 may use the particular capability for $n_2$. Otherwise, UE 120 may select a different capability $n_2$ for determining the minimum processing timeline capability and the associated UE processing capability. More specifically, if one carrier among all configured carriers, or among only those with low priority channels to be cancelled or among those with the high priority grant (for the high priority uplink transmission) and the low priority channels to be cancelled is configured with Cap #2 (either for $n_2$ on the uplink or $n_1$ on the downlink), then the UE 120 may compute $T_{proc,2}$ based at least in part on cap #2 $n_2$ of the subcarrier spacing from the first step (e.g., the minimum subcarrier spacing of the set of subcarrier spacings). Otherwise, the UE 120 may compute $T_{proc,2}$ based on cap #1 $n_2$ of the subcarrier spacing from the first step. Thus, the minimum processing timeline capability may be an uplink shared channel processing capability (e.g., $n_2$), and may be based at least in part on one or more timing capabilities of a set of carriers associated with the first uplink transmission and the second uplink transmission. The set of carriers may include carriers that carry one or more of the PDCCHs, PDSCHs, PUSCHs, or PUCCHs described above. The one or more timing capabilities may include cap #1 $n_2$, cap #2 $n_2$, cap #1 $n_1$, and/or cap #2 $n_1$ described above.

Furthermore, the determination of the minimum processing timeline capability may be based at least in part on configurations of an uplink processing capability (e.g., $n_2$) and a downlink processing capability (e.g., $n_1$). For example, the uplink processing capability may be a processing capability time for a PUSCH (e.g., a high priority uplink transmission) and the downlink processing capability may be a processing capability for a PDSCH (e.g., associated with a low priority uplink transmission).

In some aspects, UE 120 may report a capability for intra-UE prioritization and may have overlapping PUCCH and/or PUSCH transmissions with a common prioritization. For example, UE 120 may be to transmit a first PUCCH with a larger priority index conveying a scheduling request and a second PUCCH with a smaller priority index, such that the first PUCCH and the second PUCCH overlap in time. In this case, UE 120 may cancel the second PUCCH starting from no later than a first overlapping symbol. Additionally, or alternatively, UE 120 may be to transmit a first PUCCH with a larger priority index to report HARQ-ACK feedback for a PDSCH scheduled by a PDCCH or a PUSCH with a larger priority index scheduled by a PDCCH and a second PUCCH with a smaller priority index. In this case, UE 120 may cancel the second PUCCH from no later than a threshold quantity of symbols after an end of a last symbol of the PDCCH indicating the first PUCCH transmission or the PUSCH transmission.

In some aspects, UE 120 may determine the UE processing capability based at least in part on an uplink capability or a downlink capability. For example, UE 120 may identify a downlink processing capability and an uplink processing capability. In this case, if either processing capability is a particular capability for $n_2$ associated with a particular carrier, UE 120 may determine the UE processing capability based at least in part on the particular capability for $n_2$.

As indicated above, FIG. 3 is provided as an example. Other examples may differ from what is described with respect to FIG. 3.

Figure 4:
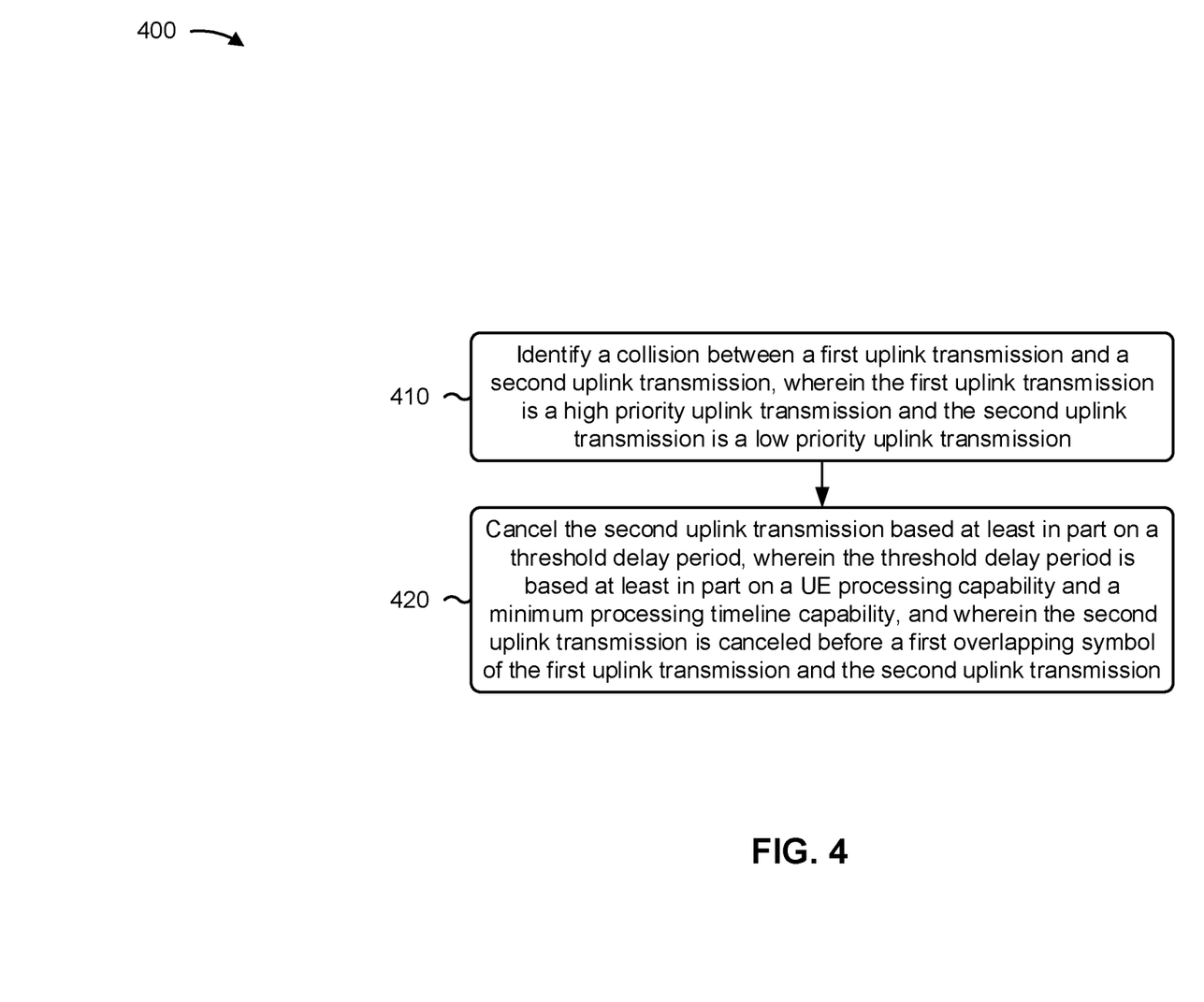
FIG. 4 is a diagram illustrating an example associated with uplink collision handling, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with uplink collision handling.

As shown in FIG. 4, in some aspects, process 400 may include identifying a collision between a first uplink transmission and a second uplink transmission, wherein the first uplink transmission is a high priority uplink transmission and the second uplink transmission is a low priority uplink transmission (block 410). For example, the UE (e.g., using receive processor 258, transmit processor 264, controller/processor 280, memory 282, and/or the like) may identify a collision between a first uplink transmission and a second uplink transmission, as described above. In some aspects, the first uplink transmission is a high priority uplink transmission and the second uplink transmission is a low priority uplink transmission.

As further shown in FIG. 4, in some aspects, process 400 may include cancelling the second uplink transmission based at least in part on a threshold delay period, wherein the threshold delay period is based at least in part on a UE processing capability and a minimum processing timeline capability, and wherein the second uplink transmission is canceled before a first overlapping symbol of the first uplink transmission and the second uplink transmission (block 420). For example, the UE (e.g., using receive processor 258, transmit processor 264, controller/processor 280, memory 282, and/or the like) may cancel the second uplink transmission based at least in part on a threshold delay period, as described above. In some aspects, the threshold delay period is based at least in part on a UE processing capability and a minimum processing timeline capability, and wherein the second uplink transmission is canceled before a first overlapping symbol of the first uplink transmission and the second uplink transmission.

Process 400 may include additional aspects, such as any single aspect or any combination of aspects described below and/or in connection with one or more other processes described elsewhere herein.

In a first aspect, the UE processing capability is based at least in part on an uplink subcarrier spacing of a carrier that is to convey the second uplink transmission.

In a second aspect, alone or in combination with the first aspect, the UE processing capability is based at least in part on a minimum subcarrier spacing of a set of subcarrier spacings of a set of carriers, and the set of carriers includes at least one of a first carrier on which a physical downlink control channel triggering the first uplink transmission is conveyed, a second carrier on which the second uplink transmission is to be conveyed, a third carrier on which the first uplink transmission is to be conveyed, or a fourth carrier on which a physical downlink control channel triggering the second uplink transmission is conveyed.

In a third aspect, alone or in combination with one or more of the first and second aspects, the minimum processing timeline capability is an uplink shared channel processing capability (e.g., a PUSCH processing capability, relating to N2) and is based at least in part on one or more timing capabilities of a set of carriers associated with the first uplink transmission and the second uplink transmission.

In a fourth aspect, alone or in combination with one or more of the first through third aspects, the UE processing capability is a minimum UE processing capability of a set of UE processing capabilities determined for a set of carriers on which the second uplink transmission is to be conveyed.

In a fifth aspect, alone or in combination with one or more of the first through fourth aspects, a subcarrier spacing for the set of UE processing capabilities is a minimum subcarrier spacing of a set of subcarrier spacings of a set of channels, the set of channels includes at least one of a first channel on which a physical downlink control channel triggering the first uplink transmission is conveyed, or a channel on which the second uplink transmission is to be conveyed.

In a sixth aspect, alone or in combination with one or more of the first through fifth aspects, the UE processing capability is based at least in part on a minimum subcarrier spacing of a set of subcarrier spacings for a set of channels, and wherein the set of channels includes at least one of a first channel on which a physical downlink control channel triggering the first uplink transmission is conveyed, a second channel on which the second uplink transmission is to be conveyed, a third channel on which a physical downlink control channel triggering the second uplink transmission is conveyed, or a fourth channel on which the first uplink transmission is to be conveyed.

In a seventh aspect, alone or in combination with one or more of the first through sixth aspects, the minimum timeline processing capability is based at least in part on a selected set of carriers.

In an eighth aspect, alone or in combination with one or more of the first through seventh aspects, the selected set of carriers includes at least one of all configured carriers, one or more carriers that are to convey the second uplink transmission, or one or more carriers that are associated with a high priority grant, and wherein the minimum timeline processing capability is based at least in part on configurations of an uplink processing capability and a downlink processing capability pertaining to the selected set of carriers.

In a ninth aspect, alone or in combination with one or more of the first through eighth aspects, the UE processing capability is based at least in part on at least one of a downlink processing capability or an uplink processing capability for a carrier associated with at least one of the first uplink transmission or the second uplink transmission.

In a tenth aspect, alone or in combination with one or more of the first through ninth aspects, the UE processing capability is based at least in part on at least one of a first UE processing capability of a first channel or a second UE processing capability of a second channel.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
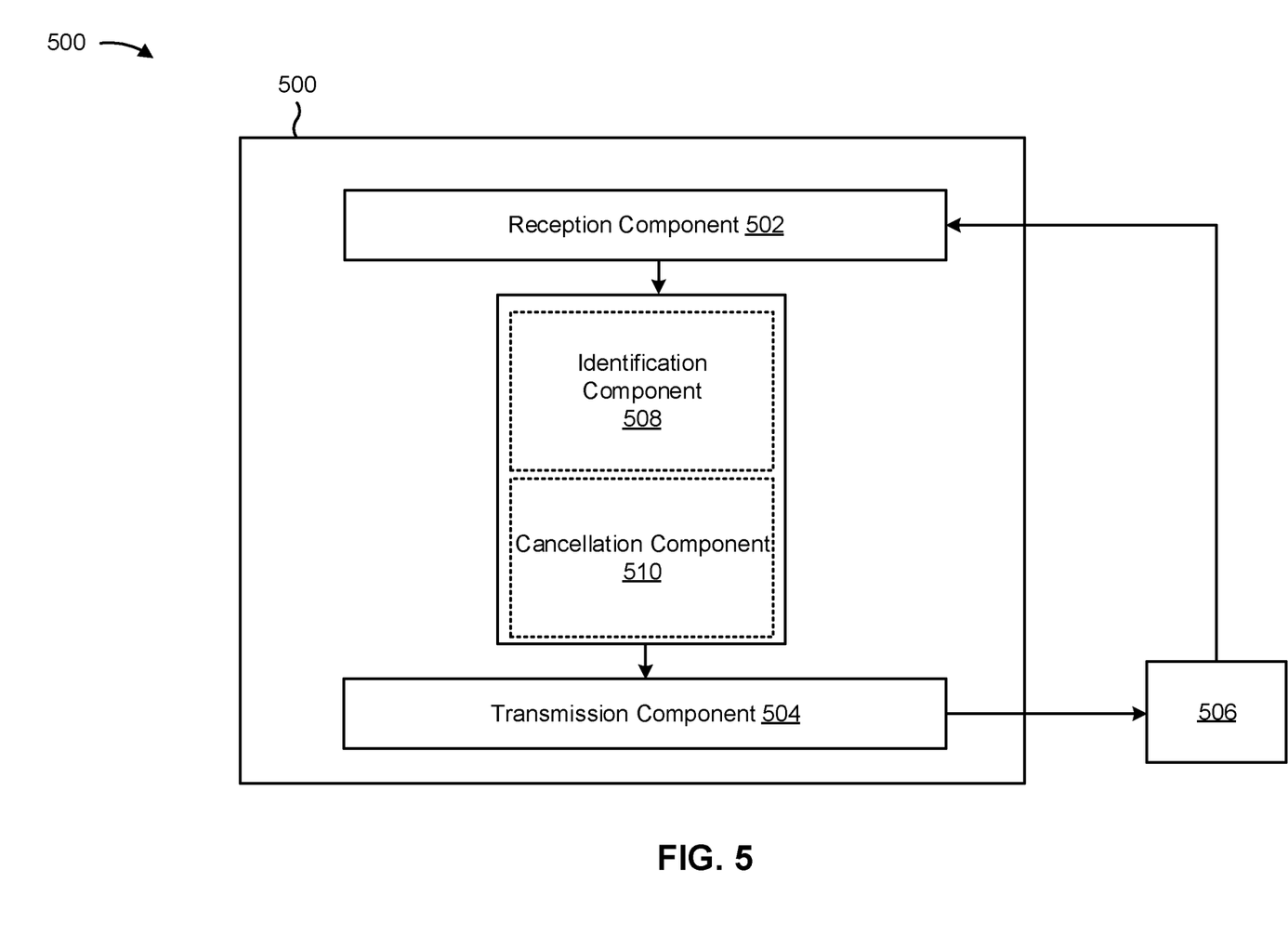
FIG. 5 is a diagram illustrating an example apparatus, in accordance with the present disclosure.

FIG. 5 is a block diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include one or more of an identification component 508 or a cancellation component 510, among other examples.

In some aspects, the apparatus 500 may be configured to perform one or more operations described herein in connection with FIG. 3. Additionally, or alternatively, the apparatus 500 may be configured to perform one or more processes described herein, such as process 400 of FIG. 4. In some aspects, the apparatus 500 and/or one or more components shown in FIG. 5 may include one or more components of the UE described above in connection with FIG. 2. Additionally, or alternatively, one or more components shown in FIG. 5 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a demodulator, a MIMO detector, a receive processor, a controller/processor, a memory, or a combination thereof, of the UE described above in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, a memory, or a combination thereof, of the UE described above in connection with FIG. 2. In some aspects, the transmission component 504 may be co-located with the reception component 502 in a transceiver.

The identification component 508 may identify a collision between a first uplink transmission and a second uplink transmission, wherein the first uplink transmission is a high priority uplink transmission and the second uplink transmission is a low priority uplink transmission. The cancellation component 510 may cancel the second uplink transmission based at least in part on a threshold delay period wherein the threshold delay period is based at least in part on a UE processing capability and a minimum processing timeline capability, and wherein the second uplink transmission is canceled before a first overlapping symbol of the first uplink transmission and the second uplink transmission.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some aspects of the present disclosure:

Aspect 1: A method of wireless communication performed by a user equipment (UE), comprising: identifying a collision between a first uplink transmission and a second uplink transmission, wherein the first uplink transmission is a high priority uplink transmission and the second uplink transmission is a low priority uplink transmission; and cancelling the second uplink transmission based at least in part on a threshold delay period, wherein the threshold delay period is based at least in part on a UE processing capability and a minimum processing timeline capability, and wherein the second uplink transmission is canceled before a first overlapping symbol of the first uplink transmission and the second uplink transmission.

Aspect 2: The method of aspect 1, wherein the UE processing capability is based at least in part on an uplink subcarrier spacing of a carrier that is to convey the second uplink transmission.

Aspect 3: The method of any of aspects 1 to 2, wherein the UE processing capability is based at least in part on a minimum subcarrier spacing of a set of subcarrier spacings of a set of carriers, and wherein the set of carriers includes at least one of: a first carrier on which a physical downlink control channel triggering the first uplink transmission is conveyed, a second carrier on which the second uplink transmission is to be conveyed, a third carrier on which the first uplink transmission is to be conveyed, or a fourth carrier on which a physical downlink control channel triggering the second uplink transmission is conveyed.

Aspect 4: The method of any of aspects 1 to 3, wherein the minimum processing timeline capability is based at least in part on an uplink timing capability of a channel on which the second uplink transmission is to be conveyed.

Aspect 5: The method of any of aspects 1 to 4, wherein the UE processing capability is a minimum UE processing capability of a set of UE processing capabilities determined for a set of carriers on which the second uplink transmission is to be conveyed.

Aspect 6: The method of aspect 5, wherein a subcarrier spacing for the set of UE processing capabilities is a minimum subcarrier spacing of a set of subcarrier spacings of a set of channels, wherein the set of channels includes at least one of: a first channel on which a physical downlink control channel triggering the first uplink transmission is conveyed, or a channel on which the second uplink transmission is to be conveyed.

Aspect 7: The method of any of aspects 1 to 6, wherein the UE processing capability is based at least in part on a minimum subcarrier spacing of a set of subcarrier spacings for a set of channels, and wherein the set of channels includes a first channel on which a physical downlink control channel triggering the first uplink transmission is conveyed, or a channel on which the second uplink transmission is to be conveyed.

Aspect 8: The method of aspect 7, wherein the minimum timeline processing capability is based at least in part on a quantity of carriers in a selected set of carriers.

Aspect 9: The method of aspect 8, wherein the selected set of carriers includes at least one of: all configured carriers, one or more carriers that are to convey the second uplink transmission, or one or more carriers that are associated with a high priority grant.

Aspect 10: The method of any of aspects 1 to 9, wherein the UE processing capability is based at least in part on at least one of a downlink processing capability or an uplink processing capability for a carrier associated with at least one of the first uplink transmission or the second uplink transmission.

Aspect 11: The method of aspect 10, wherein the UE processing capability is based at least in part on at least one of a first UE processing capability of a first channel or a second UE processing capability of a second channel.

Aspect 12: An apparatus for wireless communication at a device, comprising a processor; memory coupled with the processor; and instructions stored in the memory and executable by the processor to cause the apparatus to perform the method of one or more aspects of aspects 1-11.

Aspect 13: A device for wireless communication, comprising a memory and one or more processors coupled to the memory, the memory and the one or more processors configured to perform the method of one or more aspects of aspects 1-11.

Aspect 14: An apparatus for wireless communication, comprising at least one means for performing the method of one or more aspects of aspects 1-11.

Aspect 15: A non-transitory computer-readable medium storing code for wireless communication, the code comprising instructions executable by a processor to perform the method of one or more aspects of aspects 1-11.

Aspect 16: A non-transitory computer-readable medium storing a set of instructions for wireless communication, the set of instructions comprising one or more instructions that, when executed by one or more processors of a device, cause the device to perform the method of one or more aspects of aspects 1-11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, the one or more processors configured to:
identify a collision between a first uplink transmission associated with a first uplink channel of a set of channels and a second uplink transmission associated with a second uplink channel of the set of channels, wherein:
the first uplink channel is different than the second uplink channel,
the first uplink transmission is a high priority uplink transmission and the second uplink transmission is a low priority uplink transmission, and
the set of channels further includes a third channel on which a physical downlink control channel triggering the first uplink transmission is conveyed and a fourth channel on which a physical downlink control channel triggering the second uplink transmission is conveyed; and
cancel the second uplink transmission based at least in part on a threshold delay period, wherein:
the threshold delay period is based at least in part on a UE processing capability and a minimum processing timeline capability;
the UE processing capability is based at least in part on a minimum subcarrier spacing of a set of subcarrier spacings for the set of channels that includes the first uplink channel, the second uplink channel, the third channel, and the fourth channel; and
the second uplink transmission is canceled before a first overlapping symbol of the first uplink transmission and the second uplink transmission.

2. The UE of claim 1, wherein the UE processing capability is based at least in part on an uplink subcarrier spacing of a carrier that is to convey the second uplink transmission.

3. The UE of claim 1, wherein the minimum processing timeline capability is an uplink shared channel processing capability and is based at least in part on one or more timing capabilities of a set of carriers associated with the first uplink transmission and the second uplink transmission.

4. The UE of claim 1, wherein the UE processing capability is a minimum UE processing capability of a set of UE processing capabilities determined for a set of carriers on which the second uplink transmission is to be conveyed.

5. The UE of claim 1, wherein the minimum processing timeline capability is based at least in part on a selected set of carriers.

6. The UE of claim 5, wherein the selected set of carriers includes at least one of:
all configured carriers,
one or more carriers that are to convey the second uplink transmission, or
one or more carriers that are associated with a high priority grant, and
wherein the minimum processing timeline capability is based at least in part on configurations of an uplink processing capability and a downlink processing capability pertaining to the selected set of carriers.

7. The UE of claim 1, wherein the UE processing capability is based at least in part on at least one of a downlink processing capability or an uplink processing capability for a carrier associated with at least one of the first uplink transmission or the second uplink transmission.

8. The UE of claim 7, wherein the UE processing capability is based at least in part on at least one of a first UE processing capability of the first uplink channel or a second UE processing capability of the second uplink channel.

9. A method of wireless communication performed by a user equipment (UE), comprising:
identifying a collision between a first uplink transmission associated with a first uplink channel of a set of channels and a second uplink transmission associated with a second uplink channel of the set of channels, wherein:
the first uplink channel is different than the second uplink channel,
the first uplink transmission is a high priority uplink transmission and the second uplink transmission is a low priority uplink transmission, and
the set of channels further includes a third channel on which a physical downlink control channel triggering the first uplink transmission is conveyed and a fourth channel on which a physical downlink control channel triggering the second uplink transmission is conveyed; and
canceling the second uplink transmission based at least in part on a threshold delay period, wherein:
the threshold delay period is based at least in part on a UE processing capability and a minimum processing timeline capability;
the UE processing capability is based at least in part on a minimum subcarrier spacing of a set of subcarrier spacings for the set of channels that includes the first uplink channel, the second uplink channel, the third channel, and the fourth channel; and
the second uplink transmission is canceled before a first overlapping symbol of the first uplink transmission and the second uplink transmission.

10. The method of claim 9, wherein the UE processing capability is based at least in part on an uplink subcarrier spacing of a carrier that is to convey the second uplink transmission.

11. The method of claim 9, wherein the minimum processing timeline capability is an uplink shared channel processing capability and is based at least in part on one or more timing capabilities of a set of carriers associated with the first uplink transmission and the second uplink transmission.

12. The method of claim 9, wherein the UE processing capability is a minimum UE processing capability of a set of UE processing capabilities determined for a set of carriers on which the second uplink transmission is to be conveyed.

13. The method of claim 9, wherein the minimum processing timeline capability is based at least in part on a selected set of carriers.

14. The method of claim 13, wherein the selected set of carriers includes at least one of:
   all configured carriers,
   one or more carriers that are to convey the second uplink transmission, or
   one or more carriers that are associated with a high priority grant, and
   wherein the minimum processing timeline capability is based at least in part on configurations of an uplink processing capability and a downlink processing capability pertaining to the selected set of carriers.

15. The method of claim 9, wherein the UE processing capability is based at least in part on at least one of a downlink processing capability or an uplink processing capability for a carrier associated with at least one of the first uplink transmission or the second uplink transmission.

16. The method of claim 15, wherein the UE processing capability is based at least in part on at least one of a first UE processing capability of the first uplink channel or a second UE processing capability of the second uplink channel.

17. A non-transitory computer-readable medium storing a set of instructions for wireless communication, the set of instructions comprising:
   one or more instructions that, when executed by one or more processors of a user equipment (UE), cause the UE to:
      identify a collision between a first uplink transmission associated with a first uplink channel of a set of channels and a second uplink transmission associated with a second uplink channel of the set of channels, wherein:
         the first uplink channel is different than the second uplink channel,
         the first uplink transmission is a high priority uplink transmission and the second uplink transmission is a low priority uplink transmission, and
         the set of channels further includes a third channel on which a physical downlink control channel triggering the first uplink transmission is conveyed and a fourth channel on which a physical downlink control channel triggering the second uplink transmission is conveyed; and
      cancel the second uplink transmission based at least in part on a threshold delay period, wherein:
         the threshold delay period is based at least in part on a UE processing capability and a minimum processing timeline capability;
         the UE processing capability is based at least in part on a minimum subcarrier spacing of a set of subcarrier spacings for the set of channels that includes the first uplink channel, the second uplink channel, the third channel, and the fourth channel; and
         the second uplink transmission is canceled before a first overlapping symbol of the first uplink transmission and the second uplink transmission.

18. The non-transitory computer-readable medium of claim 17, wherein the UE processing capability is based at least in part on an uplink subcarrier spacing of a carrier that is to convey the second uplink transmission.

19. The non-transitory computer-readable medium of claim 17, wherein the minimum processing timeline capability is an uplink shared channel processing capability and is based at least in part on one or more timing capabilities of a set of carriers associated with the first uplink transmission and the second uplink transmission.

20. The non-transitory computer-readable medium of claim 17, wherein the UE processing capability is a minimum UE processing capability of a set of UE processing capabilities determined for a set of carriers on which the second uplink transmission is to be conveyed.

21. The non-transitory computer-readable medium of claim 17, wherein the minimum processing timeline capability is based at least in part on a selected set of carriers.

22. An apparatus for wireless communication, comprising:
   means for identifying a collision between a first uplink transmission associated with a first uplink channel of a set of channels and a second uplink transmission associated with a second uplink channel of the set of channels, wherein:
      the first uplink channel is different than the second uplink channel,
      the first uplink transmission is a high priority uplink transmission and the second uplink transmission is a low priority uplink transmission, and
      the set of channels further includes a third channel on which a physical downlink control channel triggering the first uplink transmission is conveyed and a fourth channel on which a physical downlink control channel triggering the second uplink transmission is conveyed; and
   means for canceling the second uplink transmission based at least in part on a threshold delay period, wherein:
      the threshold delay period is based at least in part on an apparatus processing capability and a minimum processing timeline capability;
      the apparatus processing capability is based at least in part on a minimum subcarrier spacing of a set of subcarrier spacings for the set of channels that includes the first uplink channel, the second uplink channel, the third channel, and the fourth channel; and
      the second uplink transmission is canceled before a first overlapping symbol of the first uplink transmission and the second uplink transmission.

23. The apparatus of claim 22, wherein the apparatus processing capability is based at least in part on an uplink subcarrier spacing of a carrier that is to convey the second uplink transmission.

24. The apparatus of claim 22, wherein the minimum processing timeline capability is an uplink shared channel processing capability and is based at least in part on one or more timing capabilities of a set of carriers associated with the first uplink transmission and the second uplink transmission.

25. The apparatus of claim 22, wherein the apparatus processing capability is a minimum apparatus processing capability of a set of apparatus processing capabilities determined for a set of carriers on which the second uplink transmission is to be conveyed.

26. The apparatus of claim 22, wherein the minimum processing timeline capability is based at least in part on a selected set of carriers.

* * * * *